(12) United States Patent
Li (10) Patent No.: US 9,824,280 B2
(45) Date of Patent: Nov. 21, 2017

(54) METHOD AND DEVICE FOR FACE IN-VIVO DETECTION

(71) Applicant: ALIBABA GROUP HOLDING LIMITED, George Town, Grand Cayman (KY)

(72) Inventor: Peng Li, Beijing (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 15/005,427

(22) Filed: Jan. 25, 2016

(65) Prior Publication Data

US 2016/0217338 A1 Jul. 28, 2016

(30) Foreign Application Priority Data

Jan. 26, 2015 (CN) .......................... 2015 1 0038591

(51) Int. Cl.
*G06K 9/00* (2006.01)

(52) U.S. Cl.
CPC ..... *G06K 9/00765* (2013.01); *G06K 9/00261* (2013.01); *G06K 9/00899* (2013.01)

(58) Field of Classification Search
CPC ....... G06K 2009/4666; G06K 9/00268; G06K 9/00744; G06K 9/4642; G06T 2207/30201
See application file for complete search history.

(56) References Cited

U.S. PATENT DOCUMENTS

| 7,130,446 | B2 | 10/2006 | Rui et al. |
| 8,457,367 | B1 | 6/2013 | Sipe et al. |
| 8,737,697 | B2 | 5/2014 | Morishita |
| 8,891,834 | B2 | 11/2014 | Chang et al. |
| 9,176,987 | B1* | 11/2015 | Peng ................. G06F 17/30253 |
| 2004/0264780 | A1 | 12/2004 | Zhang et al. |
| 2008/0267461 | A1 | 10/2008 | Ianculescu et al. |
| 2009/0141949 | A1 | 6/2009 | Lee et al. |
| 2009/0169065 | A1* | 7/2009 | Wang ................ G06F 17/30781 |
| | | | 382/118 |
| 2009/0290791 | A1 | 11/2009 | Holub et al. |

(Continued)

OTHER PUBLICATIONS

PCT International Search Report and Written Opinion dated Apr. 8, 2016, issued in corresponding International Application No. PCT/US2016/14698 (9 pages).

*Primary Examiner* — Phuoc Tran (74) *Attorney, Agent, or Firm* — Finnegan, Henderson, Farabow, Garrett & Dunner LLP (57) ABSTRACT

A face detection method includes acquiring a video image sequence, performing a video shot boundary detection process on the video image sequence to determine whether a shot change exists in the video image sequence to obtain a first judgment result, and determining, when the first judgment result indicates that a shot change exists in the video image sequence, that face detection has failed. The present disclosure also provides a face detection device, which includes an acquisition unit configured to acquire a video image sequence, a first detection unit configured to perform a video shot boundary detection process on the video image sequence to determine whether a shot change exists in the video image sequence to obtain a first judgment result, and a determination unit configured to determine, when the first judgment result indicates that a shot change exists in the video image sequence, that face detection has failed.

20 Claims, 5 Drawing Sheets

(56) References Cited

U.S. PATENT DOCUMENTS

| | | |
|---|---|---|
| 2010/0310134 A1 | 12/2010 | Kapoor et al. |
| 2012/0106806 A1 | 5/2012 | Folta et al. |
| 2013/0015946 A1 | 1/2013 | Lau et al. |
| 2014/0307929 A1* | 10/2014 | Nechyba ............ G06K 9/00228 |
| | | 382/118 |
| 2014/0337930 A1 | 11/2014 | Hoyos et al. |
| 2016/0275342 A1* | 9/2016 | Silva .................... G06K 9/6209 |

* cited by examiner

METHOD AND DEVICE FOR FACE IN-VIVO DETECTION

CROSS-REFERENCE TO RELATED APPLICATION

This application is based upon and claims priority to Chinese Patent Application No. 201510038591.6, filed Jan. 26, 2015, the entire contents of which are incorporated herein by reference.

TECHNICAL FIELD

The present invention relates to the technical field of data processing, and in particular, to a face in-vivo detection method and device.

BACKGROUND ART

Face recognition, as an effective identity authentication and recognition technology, has been widely used for its convenience, user friendliness, and non-contact required, etc. But a face recognition system is also easily subjected to attacks from illegal users. Security of a face recognition system becomes a substantial concern.

The attacks against the face recognition system mainly include three types: photo attack, video attack, and 3D model attack. After obtaining the photos or videos of a valid user, outlaws or fake users may use the photos or videos of the valid user as a forged face to attempt to fraud the system. In order to distinguish real faces from photos and videos and to take precautions against possible attacks to the face recognition system, there are mainly three kinds of detection methods in conventional art: (1) distinguishing real face imaging from photo or video re-imaging through an image classification method; (2) determining by a video tracking technology that it is a real face, instead of a static photo or a 3D model; and (3) letting the user to do some actions at random by a user interaction technology, and judging whether the user's actions are correct by a computer vision technology, so as to determine that the gathered information is a live face, instead of a forged photo, a video, or a 3D model.

The method based on image classification has a low accuracy, high false determination ratio, and low security. The video tracking technology has a high accuracy of face detection, but it requires a large amount of calculations and is difficult to realize real-time processing on different terminal devices. The third method has a fast processing speed and can realize real-time processing on different terminal devices, but since its accuracy is relatively limited, it cannot defend against some deliberate attacks. Therefore, there is a need for a face in-vivo detection method and system, which can defend against deliberate attacks and improve the security of face detection systems.

SUMMARY

The present disclosure provides a face detection method. Consistent with some embodiments, the method includes acquiring a video image sequence, performing a video shot boundary detection process on the video image sequence to determine whether a shot change exists in the video image sequence to obtain a first judgment result, and determining, when the first judgment result indicates that a shot change exists in the video image sequence, that face detection has failed.

According to some embodiments, the video shot boundary detection process includes performing an image feature extraction on the video image sequence in an image feature extraction region to obtain image feature vectors, calculating, with the image feature vectors of two image frames, to obtain a similarity value between the two image frames to determine content continuity of the two image frames, and determining, when it is determined that the two image frames are discontinuous in content according to the similarity value, that a shot change exists in the video image sequence. The image feature extraction region may include a single pixel feature extraction region, a pixel block feature extraction region, or a complete frame image feature extraction region. According some embodiments, the two image frames are the $i^{th}$ image frame and the $j^{th}$ image frame, where $j=i+n(n \geq 1)$, $i \geq 1$.

In some embodiments, the video shot boundary detection process includes a video shot cut detection process. When the similarity value between the two image frames is smaller than a first threshold value, it may be determined that a cut change exists between the two image frames and a shot change exists in the video image sequence.

According to some other embodiments, the video shot boundary detection process comprises a video shot gradual change detection process. The determining, when it is determined that the two image frames are discontinuous in content according to the similarity value between the two frames of images, that a shot change exists in the video image sequence may include obtaining, when it is determined that the similarity value between the two frames of images is greater than a third threshold value and is smaller than a fourth threshold value, subsequent image frames of the two image frames, calculating a similarity value between pairwise image frames of the subsequent image frames until the similarity value between the pairwise image frames is greater than the fourth threshold value, calculating a sum of the similarity values of the obtained image frames, and determining, when the sum of the similarity values is smaller than a fifth threshold value, that a gradual change exists in the video image sequence and a shot change exists in the video image sequence.

According to some further embodiments, the method may further include carrying out the face detection based on a face feature point detection process to obtain a second judgment result, and determining, when the second judgment result indicates that face detection conditions are satisfied and the first judgment result shows that no shot change exists in the video image sequence, that the face detection has passed.

Consistent with some other embodiments of the present disclosure, the video shot boundary detection process may include performing an image feature extraction on the video image sequence in an image feature extraction region to obtain image feature vectors, calculating, with the image feature vectors of two image frames, to obtain a frame difference value between the two image frames to determine content continuity of the two image frames, and determining, when it is determined that the two image frames are discontinuous in content according to the calculated frame difference value between the two image frames, that a shot change exists in the video image sequence.

According to some embodiments, the video shot boundary detection process may include a video shot cut detection process. The determining, when it is determined that the two image frames are discontinuous in content according to the frame difference value between the two frames of images, that a shot change exists in the video image sequence may include determining, when the frame difference value between the two image frames is greater than a second threshold value, that a cut change exists between the two image frames and a shot change exists in the video image sequence.

According to some other embodiments, the video shot boundary detection process may include a video shot gradual change detection process. The determining, when it is determined that the two image frames are discontinuous in content according to the frame difference value between the two image frames, that a shot change exists in the video image sequence may include obtaining, when it is determined that the frame difference value between the two image frames is greater than a six threshold value and is smaller than a seven threshold value, subsequent image frames of the two image frames, calculating the frame difference value between pairwise image frames of the subsequent image frames until the frame difference value between the pairwise image frames is smaller than the six threshold value, calculating a sum of the frame difference values, and determining, when the sum is greater than the seventh threshold value, that a gradual change exists in the video image sequence and a shot change exists in the video image sequence.

The present disclosure also provides a face detection device. Consistent with some embodiments, the device includes an acquisition unit configured to acquire a video image sequence, a first detection unit configured to perform a video shot boundary detection process on the video image sequence to determine whether a shot change exists in the video image sequence to obtain a first judgment result, and a determination unit configured to determine, when the first judgment result indicates that a shot change exists in the video image sequence, that face detection has failed.

In some embodiments, the first detection unit may be further configured to perform an image feature extraction on the video image sequence in an image feature extraction region to obtain image feature vectors, calculate a similarity or frame difference value based on the image feature vectors of two image frames to determine content continuity of the two image frames, and determine, when it is determined that the two image frames are discontinuous in content according to the similarity or frame difference value, that a shot change exists in the video image sequence.

In some embodiments, the face detection device may include a second detection unit configured to carry out a face feature point detection process to obtain a second judgment result. The determination unit may be configured to determine, when the second judgment result indicates that face detection conditions are satisfied and the first judgment result shows that no shot change exists in the video image sequence, that the face detection has passed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Consistent with some embodiments of this disclosure, a method and an apparatus for face in-vivo detection are provided. The method provided by the present application may be applied to a face recognition detection device which is applicable to various electronic equipment. The electronic equipment may be electronic equipment currently available, being developed or will be developed in the future, including, but not limited to, desktop computers, laptop computers, mobile devices (including smart phones, non-smart phones, tablet computers) and the like. The electronic equipment may be provided with an image capturing device, such as a camera. Alternatively the face recognition detection device may include an image capturing device. The image capturing device is used for capturing a video image sequence.

Figure 1A:
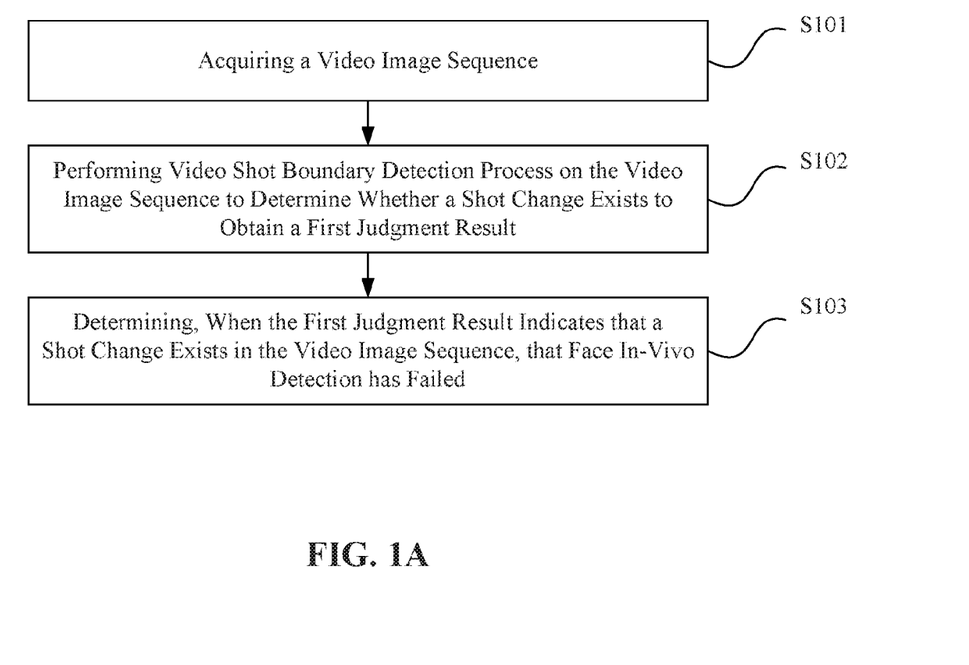
FIG. 1A is a flowchart of a face in-vivo detection method according to some embodiments of the present disclosure.

FIG. 1A is a schematic flow diagram of a face in-vivo detection method provided by embodiments of the present application. The method may include the following steps:

S101, acquiring a video image sequence to be processed.

A face in-vivo detection device captures video images, which may be a series of video frames, through an image capturing device, such as a camera. The image capturing device may be built in the face in-vivo detection device or provided on external equipment.

S102, performing a video shot boundary detection process on the video image sequence to be processed to determine whether a shot change exists in the video image sequence to obtain a first judgment result.

If the captured video image sequence includes images formed by a real face, there should be no obvious shot changes. If a third party attacks the face detection system, for example, a false user forges the actions performed by the valid user by shaking, twisting, or folding real photos of the valid user before the camera in an attempt to deceive or attack the face in-vivo detection device, a shot change may exist in the captured video image sequence. In some embodiments of the present application, the video shot boundary detection process is performed on the video image sequence to be processed to determine whether a shot change exists in the video image sequence, thus determining whether there is an attack or deception. The video shot boundary detection process may include:

performing a video shot boundary cut detection on the video image sequence to be processed to determine whether a shot change exists in the video image sequence; and/or performing a video shot boundary gradual change detection on the video image sequence to be processed to determine whether a shot change exists in the video image sequence.

A video shot boundary cut refers to a quick shot cut, which is often completed in two adjacent video frames. A video shot boundary gradual change refers to a gradual and slow shot change, which is usually a process of a gradual change of a video sequence.

Figure 1B:
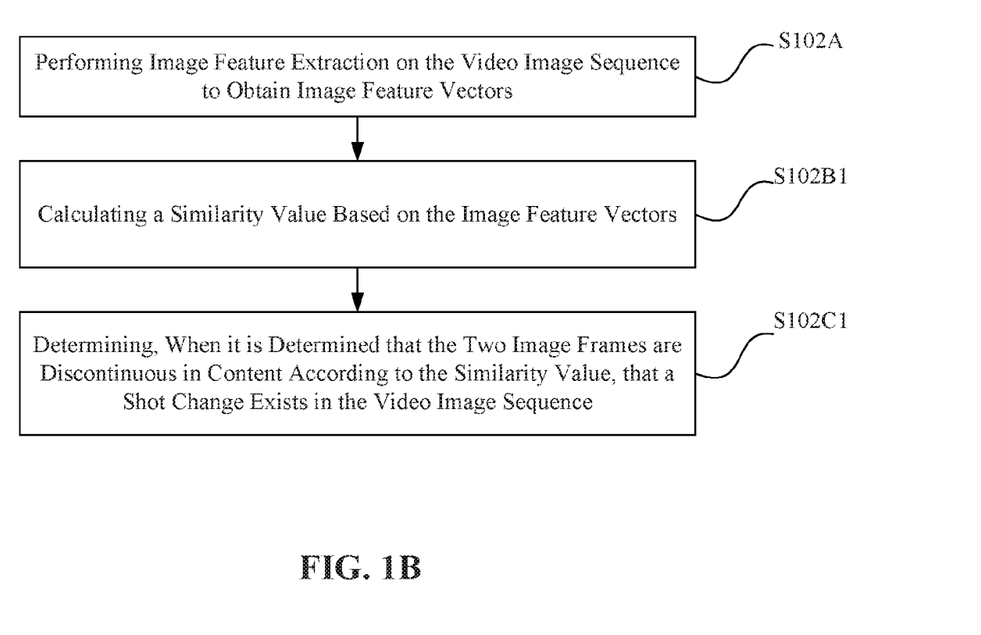
FIG. 1B is a flowchart of a face in-vivo detection method according to one exemplary embodiment of the present disclosure.
Figure 1C:
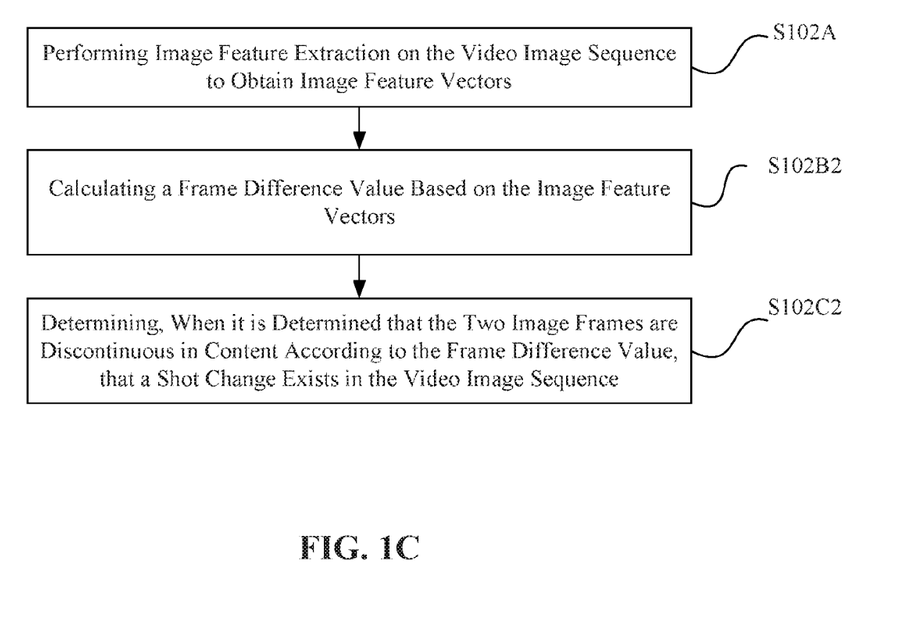
FIG. 1C is a flowchart of a face in-vivo detection method according to one exemplary embodiment of the present disclosure.

Both video shot boundary cut change detection and video shot boundary gradual change detection can determine whether a shot change exists by comparing the intensities of pixel changes of two video frames. For example, the video shot boundary detection process can include the following steps:

S102A, as shown in FIGS. 1B and 1C, in a feature extraction region on the images, extract features from the video image sequence, to obtain image feature vectors.

The feature extraction region can be a preset region. In the embodiments of the present application, different types of feature extraction regions can be employed. For example, the feature extraction region may include a single pixel, a pixel block, or a whole frame image. Each feature extraction region has respective advantages, and different image feature regions can be selected as required.

After the image feature extraction region is selected, for the single pixel feature extraction region, the image feature extraction can be performed on pixels one by one; for the pixel block feature extraction region, the image features can be extracted in a unit of, for example, a delimited rectangular block; and for the whole frame image feature extraction region, the image features are extracted in a unit of a whole frame image.

The image features can be extracted in flexible and various ways. According to some embodiments of the present application, image feature extraction can include at least one of:

(1) obtaining, in a selected color region, pixel gray level statistics or pixel color statistics of one or more video frames in the video image sequence, and constituting the image feature vectors with the obtained pixel gray level statistics or pixel color statistics.

The color region can be a red, green, blue (RGB) color region, and can also be Hue Saturation Value (HSV) color region; other color regions can be also selected.

According to some embodiments, in order to eliminate the impact of illumination variations, multiple statistics can be selected on an appropriate color region. For example, the statistics can be the maximum, minimum, or intermediate value. The obtained pixel grey level statistics or pixel color statistics are utilized to constitute the image feature vectors.

(2) obtaining the gray level histogram or color histogram of one or more video frames in the video image sequence.

The histogram of adjacent image frames changes substantially if the two adjacent image frames are at the boundaries of and belong two different shots; while for two adjacent image frames within the same shot, the histogram thereof changes slightly. The chance that the contents of two image frames are very different, but their histograms are similar, is very small. Thus, the video shot boundary detection can be carried out by utilizing the gray level histogram or color histogram. Histograms are generally used for illustrating the distribution of colors, and the gray level or color histograms of similar photos are very similar; while the gray level or color histograms of two image frames between which a boundary change occurs, normally are very different. Existing methods in the prior art for obtaining gray level histograms and color histograms can be used in the embodiments of this disclosure, and they are not described.

(3) obtaining image boundary features of one or more video image frames in the video image sequence.

Image boundaries are often composed of points with substantial pixel changes. The shot boundary can be detected by utilizing the features in different modes of the boundary obtained by shot cut. The method of extracting boundary features can include methods such as Canny, Sobel, etc.

(4) transforming original images into other feature regions by means of a compressed domain to obtain corresponding image feature vectors.

In some embodiments, a compressed domain can be utilized to express inherent features of an image, so as to distinguish the different modes of the shot boundary and non-boundary. The compressed domain may include modes such as Wavelet transformation, which are not limited herein. Any method is applicable as along as it can distinguish the image features.

The above methods for image feature extraction are described for illustrative purposes only, and can be used alone or in combination. Other implementation modes obtained by those skilled in the art without involving an inventive effort shall fall within the scope of protection of the present application.

S102B1, as shown in FIG. 1B, calculating a similarity value between the two image frames based on the determined image feature vectors of the two image frames. The similarity value of the two image frames is used to determine the content continuity of the two image frames.

After the feature regions and image features to be extracted are determined, the feature vectors can be extracted for any image frame in the video. Then the content continuity between successive frames is measured by similarity calculation. The similarity between two image frames can be calculated through various methods, and can be obtained based on the extracted image feature vectors of the two image frames. It should be appreciated by those skilled in the art that the similarity between the two image frames can also be calculated by adopting other methods, including for example, the similarity being measured by a method of calculating a ratio of the image feature vectors of the two image frames, in which the closer to 1 the ratio is, the higher the similarity is. The following description takes a method of obtaining the similarity value between two image frames based on the frame difference between the two image frames as an example. According to some embodiments, the difference can be calculated as follows.

In the following equation, f(i) represents the image feature vector of the $i^{th}$ frame and f(j) represents the image feature vector of the $j^{th}$ frame. The frame difference D(i, j) between the adjacent frames is represented by:

$$D(i,j)=|f(j)-f(i)| \qquad (1)$$

wherein, $j=i+n (n \geq 1)$, $i \geq 1$.

During the calculation of the similarity, generally $j=i+1$. Then any two adjacent frames in the video will be processed. In order to improve the processing speed and reducing the amount of calculation, some methods may set $j=i+n (n>1)$. The value range of n can be set according to experience and users' requirements, so that the change between two image frames spaced by n frames can be captured, and meanwhile, the amount of calculation can be reduced to improve the processing speed.

In general, the greater the frame difference is, the lower the similarity is; the smaller the frame difference is, the greater the similarity is. Usually, if the two image frames are located in the same shot, the similarity is greater; if the two image frames are located at the shot boundaries, then the similarity between the two frames is smaller. Thus, the similarity value can be obtained based on the frame difference. The frame difference between two image frames is inversely proportional to the similarity value between the two image frames. For example, the reciprocal value of the obtained frame difference D(i, j) can be used as the value of the similarity S(i, j). In some other embodiments, the similarity value can also be obtained through other calculation methods by utilizing the frame difference based on the linearly proportional relationship.

In some further embodiments, the content continuity can also be directly determined by calculating a frame difference value between the two image frames. Such a method may include:

S102B2: as shown in FIG. 1C, calculating a frame difference value between the two image frames based on the determined image feature vectors of the two image frames. The frame difference value between the two image frames is used to determine the content continuity of the two image frames.

The calculation for the frame difference value between the two image frames can be carried out with the method shown in equation (1). The two image frames can be any two adjacent image frames or image frames spaced by n frames. The value range of n can be set according to experience and users' requirements, so that the change between the two image frames spaced by n frames can be captured, and meanwhile, the amount of calculation can be reduced to improve the processing speed.

When the similarity value is used to measure whether the two image frames are continuous in S102B1, the similarity value can be used to determine whether a shot change exists in the video image sequence. Such a method may include:

S102C1, as shown in FIG. 1B, determining, when it is determined that the two image frames are discontinuous in content according to the calculated similarity value between the two image frames, that a shot change exists in the video image sequence.

A person having ordinary skill in the art should appreciate that S102C1 may have different implementation modes for the video shot cut change detection and the video shot gradual change detection. For example, when the video shot boundary detection process includes a video shot boundary cut detection process, the determining, when it is determined that the two image frames are discontinuous in content according to the calculated similarity value between the two image frames, that a shot change exists in the video image sequence includes: determining, when the similarity value between the two image frames is smaller than a first threshold value, that a cut change exists between the two image frames and a shot change exists in the video image sequence. The first threshold value can be preset by a user.

In an exemplary implementation, the following classification function can be used:

$$L(S(i, j)) = \begin{cases} 0, & \text{if } S(i, j) > T \\ 1, & \text{otherwise} \end{cases} \quad (2)$$

where, T is the first threshold value, S(i, j) represents the similarity value, and L represents the classification result; if S(i, j) is greater than T, the similarity value is relatively high, indicating that the two image frames are adjacent frames in the same shot; otherwise, indicating a shot change between the two image frames. S(i, j) can be obtained by the D(i, j) in equation (1). For example, the reciprocal value of the obtained frame difference D(i, j) can be used as the similarity value S(i, j).

According to some other embodiments, when the video shot boundary detection includes a video shot cut detection, the determining, when it is determined that the two image frames are discontinuous in content according to the calculated similarity value between the two image frames, that a shot change exists in the video image sequence may include: judging the similarity value between the two image frames based on a k-Nearest Neighbor (KNN) classifier, a decision tree, or a support vector machine (SVM); and determining, when the judgment result indicates that a cut change exists between the two image frames, that a shot change exists in the video image sequence. In an exemplary implementation, the shot boundary detection can be considered to be the classification problem in pattern recognition. Many classification algorithms for judgment can be applied to this problem, including, but not limited to, the KNN, the decision tree, and the SVM. According to one embodiment, the acquired image feature vectors can be inputted in an machine learning model that employs the above-mentioned algorithms, and a corresponding judgment result will be obtained.

In another exemplary implementation, when the video shot boundary detection process includes a video shot gradual change detection process, the determining, when it is determined that the two image frames are discontinuous in content according to the calculated similarity between the two image frames, that a shot change exists in the video image sequence includes:

obtaining, when it is determined that the similarity value between the two image frames is greater than a third threshold value and smaller than a fourth threshold value, subsequent image frames of the two image frames;

calculating the similarity value between pairwise image frames of the subsequent image frames until the similarity value between the pairwise image frames is greater than the fourth preset threshold value; and calculating the accumulated similarity values of various image frames, and determining, when the accumulated similarity value is smaller than a fifth threshold value, that a gradual change exists in the video image sequence and a shot change exists in the video image sequence. The various image frames are those obtained from the first image frame of the two image frames to the one where the similarity between the pairwise image frames is greater than the fourth preset threshold value. In particular, the accumulated similarity values of the various image frames are the sum of the similarity values between the pairwise image frames of the various image frames.

The third preset threshold value, the fourth preset threshold value, and the fifth preset threshold value can be preset by a user according to experience and the user's requirements. The acquiring subsequent image frames can include continuously acquiring the next image frame and the image frame after the next image frame. For example, assuming the first pair includes the first and second image frames. The subsequent image frames (i.e., the next pair) can include the second and third image frames. Alternatively, as discussed above, the pair can include the $i^{th}$ and $j^{th}$ image frames, where $j=i+n(n \geq 1)$, $i \geq 1$. The next pair can include the $j^{th}$ and the $(j+n)^{th}$ image frames.

In another exemplary implementation, corresponding to the judging that the two image frames are discontinuous in content by means of the frame difference value in S102B2, the method may further include:

S102C2: as shown in FIG. 1C, determining, when it is determined that the two image frames are discontinuous in content according to the frame difference value between the two image frames, that a shot change exists in the video image sequence.

When the video shot boundary detection process includes a video shot cut detection process, the determining, when it is determined that the two image frames are discontinuous in content according to the frame difference between the two image frames, that a shot change exists in the video image sequence includes: determining, when the frame difference value between the two image frames is greater than a second threshold value, that a cut change exists between the two image frames and a shot change exists in the video image sequence. The second threshold value can be preset by a user.

In another exemplary implementation, when the video shot boundary detection process includes a video shot cut detection process, the determining, when it is determined that the two image frames are discontinuous in content according to the frame difference between the two image frames, that a shot change exists in the video image sequence includes: judging the frame difference value between the two image frames based on a KNN classifier, a decision tree, or an SVM, and determining, when the judgment result indicates that a cut change exists between the two image frames, that a shot change exists in the video image sequence.

The above-mentioned judgment that the video shots have gradual change can also be obtained by calculating frame difference value using the methods as discussed above.

In yet another exemplary implementation, when the video shot boundary detection process includes a video shot gradual change detection process, the determining, when it is determined that the two image frames are discontinuous in content according to the frame difference value between the two image frames, that a shot change exists in the video image sequence includes:

obtaining, when it is determined that the frame difference value between the two image frames is greater than a six threshold value and is smaller than a seven threshold value, subsequent image frames of the two image frames;

calculating the frame difference between the pairwise image frames of the subsequent image frames until the frame difference between the pairwise image frames is smaller than the six preset threshold value; and calculating the sum of the various obtained frame differences, and determining, when the sum is greater than the seventh preset threshold value, that a gradual change exists in the video image sequence and a shot change exists in the video image sequence.

The sixth and seventh threshold values can be preset by a user. The subsequent image frames can be obtained as discussed above with respect to S102C1. The frame difference value between the two image frames can be obtained through the image feature vectors of the two image frames as discussed above. Specifically, the method shown in equation (1) can be used.

As discussed above, a dual-threshold comparison method can be used for the gradual change detection. The method may include: setting two thresholds, i.e., the sixth threshold value $T_1$ (the smaller threshold) and the seventh threshold value $T_h$ (the greater threshold); judging, when the difference between two adjacent image frames exceeds $T_h$, that an abrupt change occurs, wherein $T_h$ plays a role here similar to T in equation (2) above. If the difference between two adjacent frames does not exceed $T_h$ but exceeds $T_1$, determine the later frame of the two adjacent frames as a start frame of a possible gradual change; continue to check each frame subsequent thereto; and if the frame difference still exceeds $T_1$, accumulate the frame differences until the difference between two adjacent frames is smaller than $T_1$. By then, if the accumulated frame difference exceeds $T_h$, determine the frame as the gradual change end frame; and if the accumulated frame difference does not exceed $T_h$, it will be considered that the gradual change is caused by other reasons instead of gradual change.

It should be noted that, the above method is for illustrative purposes only, and should not be taken as a limitation to the present invention, and other methods, such as the method based on background modeling, can also be adopted to carry out the video shot boundary detection.

The face in-vivo detection method may further include S103, determining, when the first judgment result indicates that a shot change exists in the video image sequence, that the face in-vivo detection fails. When it is judged that a shot change exists in the video image sequence, it is considered that the face in-vivo detection fails. The method shown in FIGS. 1A-1C and described above can be implemented by computer systems or servers with one or more processors and memories. The memory may be a non-transitory computer-readable storing medium storing instructions, that when executed by the processor, cause the computer system or server to perform the steps in the method.

In this embodiment, the video shot boundary detection process is carried out to the video image sequence to be processed to determine whether a shot change exists in the video image sequence; and when it is determined that a shot change exists in the video image sequence, it is determined that the face in-vivo detection system is attacked or deceived, and thereby determining that the face in-vivo detection fails. The method provided by the present application can effectively distinguish a real face from a photo or video through the video shot boundary detection process, prevent the face in-vivo detection system from possible attacks using photos and videos, and improve the accuracy and safety for detection.

In some embodiments, the judgment result on whether a shot change exists as described above can be considered as a first judgment result. The face in-vivo detection method may use a second judgment to further confirm the first judgment. The face in-vivo detection method may further include:

performing a face in-vivo detection based on face feature point positions to obtain a second judgment result; and determining, when the second judgment result indicates that face in-vivo detection meets certain requirements (described below) and the first judgment result indicates that no shot change exists in the video image sequence, that the face in-vivo detection has passed.

In an exemplary implementation, the face in-vivo detection based on face feature point positions to obtain a second judgment result includes: obtaining a video image sequence to be processed, and detecting whether a face appears in the video image sequence; if so, obtaining size and position information of the face; determining face key points on the detected face according to the obtained size and position information of the face; detecting whether captured user actions meet the predetermined conditions based on positions of the face key points to obtain the second judgment result; determining, when the second judgment result indicates that the user actions meet the predetermined conditions, that the face in-vivo has been detected; and determining, when the second judgment result indicates that the user actions do not meet the predetermined conditions, that no face in-vivo has been detected. The predetermined conditions can be whether the user actions conform to random prompt instructions, and/or whether the number of the user actions meets the predetermined number.

Figure 2:
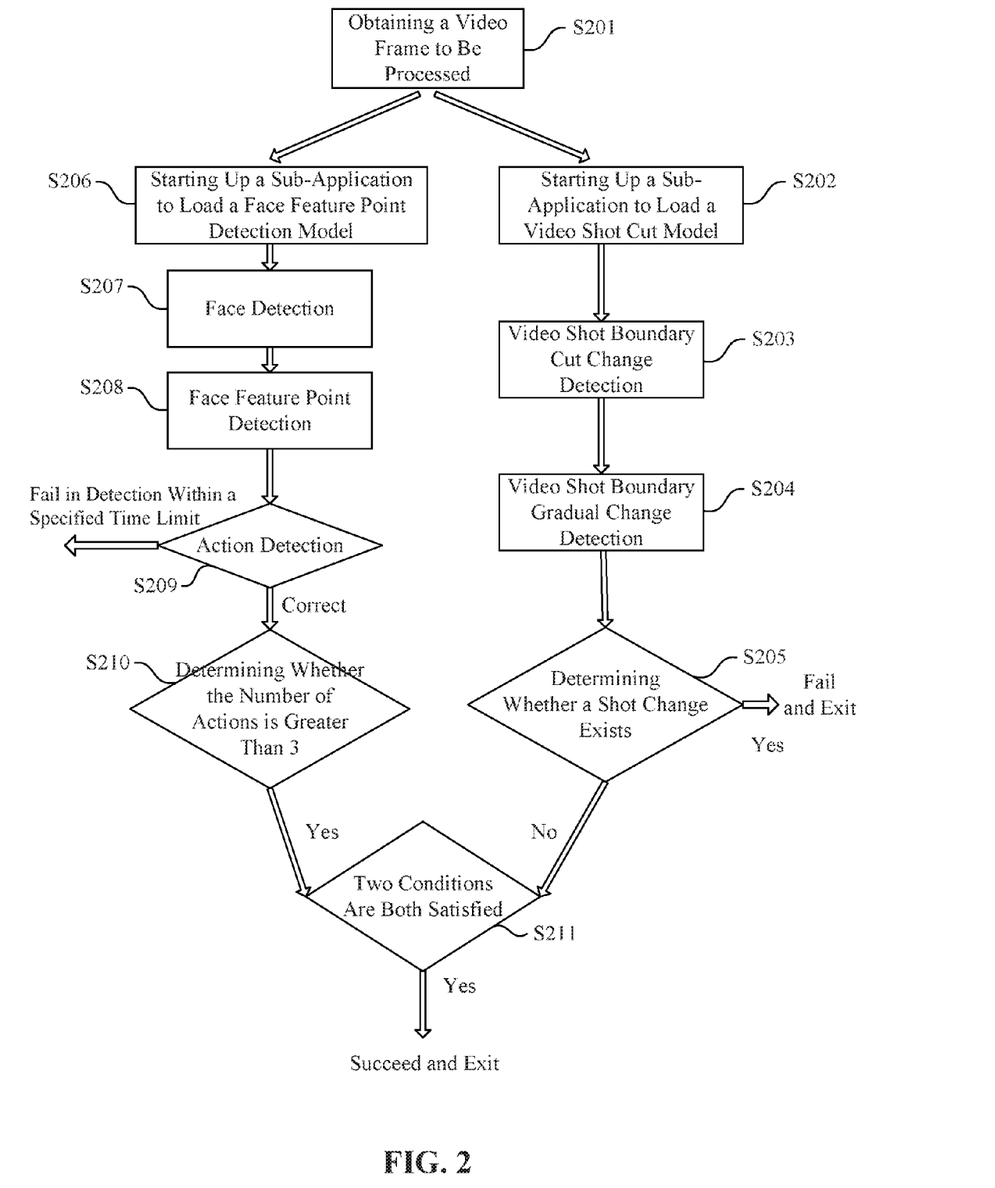
FIG. 2 is a flowchart of a face in-vivo detection method according to some other embodiments of the present disclosure.

FIG. 2 shows a flow diagram of a face in-vivo detection method, consistent with some embodiments of the present application. In the method as shown in FIG. 2, the face in-vivo detection is carried out based on the combination of the face feature point detection and the video shot boundary detection. Because of the combination, the accuracy of the face detection is improved. The method has a wide scope of applications. It is applicable to PCs, cellphones, and tablet devices.

A user can use a video camera to record his/her face for in-vivo face detection. The face detection process may start with a video frame input as shown in the flow diagram in FIG. 2. The face detection process may diverge into two main lines for processing. The two main lines respectively represent two processes, one based on a face feature point detection and the other based on a video shot boundary detection. In FIG. 2, S201 to S205 depict the process flow of the video shot boundary detection, and S206 to S210 depict the process flow of the face feature point detection. The two flows can be executed concurrently in order to improve the processing efficiency, thereby obtaining more accurate judgment results. The two flows can also be executed at different times. For example, the process flow of the video shot boundary detection can be performed first, and after it is determined that no shot change exists, the process flow of the face feature point detection is then performed. Alternatively, the face in-vivo detection process based on the face feature point detection can be performed first, and after it is determined that the face in-vivo detection conditions are satisfied, whether a shot change exists is then judged. The specific implementations can be flexible and can be adjusted as desired. The method shown in FIG. 2 can be implemented by computer systems or servers with one or more processors and memories. The memory may be a non-transitory computer-readable storing medium storing instructions, that when executed by the processor, cause the computer system or server to perform the steps in the processes. For example, the following description uses a computer system as the system that implements the method. The computer system may include a memory for storing the instructions, images, and videos. The computer system may include a sub-system for performing a section of the process. The computer system may include software applications, which, when initiated, perform a section of or the whole process.

As shown in FIG. 2, the process may include:

S201, obtaining a video frame to be processed.

S202, starting up a sub-application to load a video shot cut model.

In this step, parameters of the video shot boundary detection sub-application are initialized, and the video shot cut model is loaded into the memory.

S203, performing the video shot boundary cut change detection. The detailed implementations are described above in connection with FIGS. 1A-1C.

S204, performing the video shot boundary gradual change detection. The detailed implementations are described in connection with FIGS. 1A-1C.

There is no particular execution order between S203 and S204. Either step can be performed first, or they can be performed concurrently.

S205, determining whether a shot change exists according to the result of the video shot boundary cut detection process and the result of the video shot boundary gradual change detection process. In some embodiments, one of S203 and S204 can be omitted in the face in-vivo detection process.

When the existence of either of the shot cut or the gradual shot change is determined according to the result of video shot boundary cut detection process and the result of the video shot boundary gradual change detection process, it is determined that a shot change exists.

If it is determined that a shot change exists, it is determined that the face in-vivo detection fails; exiting the application.

If it is determined that no shot change exists, go to S211.

S206, starting up a sub-application to load a face feature point detection model.

The parameters of the sub-application based on the face feature point detection and user interactions are initialized, and the face feature point detection model files are loaded into the memory.

S207, detecting whether a face appears in the video frames; if yes, returning the size and position of the face. In an exemplary implementation, an Adaboost classifier based on Haar features can be used as a face detector.

S208, performing the face feature point detection.

In an exemplary implementation, the positions of key points in the face are detected, and the information of these key points can be used for the follow-up action detection. The number of the key points can be selected according to actual needs. For example, only 5 points including the eyes, the nose and the corners of the mouth can be used. As another example, 68 points covering the whole face can be used. According to some embodiments, the face feature point detection can use a Supervised Descent Method (SDM) algorithm. This algorithm is a method for carrying out optimization regression on the relationship between face local features and positions of face key points through a machine learning algorithm. It should be noted that, the face feature point detection method can also use other methods or algorithms, such as a method based on Active Apparent Model (AAM), a method based on Random Forrest Regression, or a method based on Deformable Part Model (DPM). A person having ordinary skill in the art should appreciate that other methods or algorithms can be used for face feature point detections. Such methods and algorithms may employ machine learning algorithms. The above-mentioned methods/algorithms can use the models of face feature points, learn the parameters of these models with training data, predict the positions of the face feature points at a future time.

S209, performing face action detection.

The actions include, but are not limited to, actions that can be expressed through the facial changes, such as shaking the head, nodding, opening the mouth, and closing the eyes. As discussed above, the action changes can be predicted and estimated through rules and the machine learning algorithms according to the position information of the face feature points in some adjacent video frames. The rules described here are action change standards artificially determined through analyzing data. The described machine learning algorithms refer to collecting and analyzing data corresponding to relations between a large amount of marked face feature point data and the face actions, so that when the computer system receives new face feature point data, it can determine the corresponding face actions based on the data models it has collected and analyzed.

S210, determining whether the number of actions made by the user according to random prompts is greater than 3. If not, going to the next action prompt; and if so, and if the user cooperates to complete the actions and the detection is successful, going to the next step for judgment. Number "3" is merely an example. It is used to determine that the action detection has been performed three times. A user can set other numbers, for example, one or more. For another example, this step can be omitted. In other words, after step S209, if the determination is correct, the process can continue to step S211.

S211, determining, when it is determined that face in-vivo detection based on face feature point detection is successful and no shot change exists, that the face in-vivo detection has passed.

In this embodiment, when the existence of a face is determined by performing the face in-vivo detection based on the face feature point detection, whether a shot change exists is further determined through a video shot boundary detection, and when no shot change exists, it is determined that the detection has passed. In either of the cases that the conditions for the face in-vivo detection are not satisfied or it is judged that a shot change exists in the video sequence, the detection is deemed failed. Therefore, the advantages of the face in-vivo detection based on the face feature point detection and the shot boundary detection are combined, and thus, not only the accuracy of the face in-vivo detection is improved, but also the system security is improved.

Figure 3:
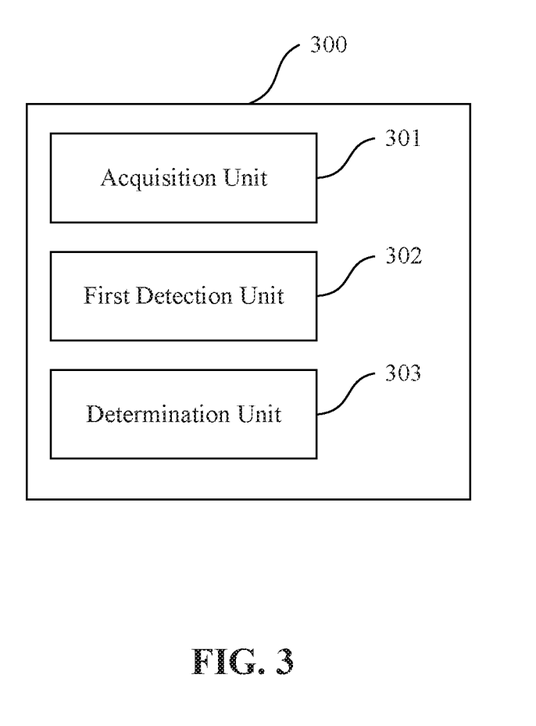
FIG. 3 is a block diagram of a face in-vivo detection device according to some embodiments of the present disclosure.

FIG. 3 shows a schematic diagram of a face in-vivo detection device provided by embodiments of the present application. As shown in FIG. 3, a face in-vivo detection device 300 includes an acquisition unit 301 configured to acquire a video image sequence to be processed, a first detection unit 302 configured to perform a video shot boundary detection process on the video image sequence to determine whether a shot change exists in the video image sequence to obtain a first judgment result, and a determination unit 303 configured to determine, when the first judgment result indicates that a shot change exists in the video image sequence, that the face in-vivo detection has passed.

In some embodiments, the first detection unit 302 may include a feature extraction unit, a similarity or frame difference calculation unit, and a judgment unit. The feature extraction unit is configured to perform image feature extraction on the video image sequence in a preset image feature extraction region to obtain image feature vectors. The similarity or frame difference calculation unit is configured to calculate, with the determined image feature vectors of the two image frames, to obtain the similarity or frame difference value between the two image frames. The two image frames can be the $i^{th}$ frame and the $j^{th}$ frame, where $j=i+n(n\geq 1)$, $i\geq 1$.

The similarity or frame difference value between the two image frames are used for determining the content continuity of the two image frames. The judgment unit is configured to determine, when it is determined that the two image frames are discontinuous in content according to the calculated similarity or frame difference value between the two image frames, that a shot change exists in the video image sequence.

The image feature extraction region set by the feature extraction unit may include a single pixel feature extraction region, a pixel block feature extraction region, or a complete image frame feature extraction region.

The feature extraction unit may include at least one the following subunits:

a color statistic subunit, configured to obtain, in a selected color region, pixel gray level statistics or pixel color statistics of one or more video frames in the video image sequence, and constitute the image feature vectors with the obtained pixel gray level statistics or pixel color statistics;

a color histogram obtaining subunit, configured to obtain a gray level histogram or color histogram of one or more video frames in the video image sequence;

an edge feature obtaining subunit, configured to obtain the image edge features of one or more video frames in the video image sequence; and a compressed domain subunit, configured to transform original images into other feature regions by means of a compressed domain to obtain corresponding image feature vectors.

The first detection unit 302 may be configured to perform the video shot cut detection and/or the video shot gradual change detection. When the first detection unit 302 is configured to perform the video shot cut detection process, the determination unit 303 is configured to determine, when the similarity value between the two image frames is smaller than a first threshold value, that a cut change exists between the two image frames and a shot change exists in the video image sequence. Alternatively, the determination unit 303 may be configured to determine, when the frame difference between the two image frames is larger than a second threshold value, that a cut change exists in the two image frames and a shot change exists in the video image sequence. The threshold values can be preset by a user.

When the first detection unit 302 is configured to perform the video shot cut detection process, the determination unit 303 may be configured to:

determine the similarity or frame difference value between the two image frames based on a k nearest neighbor algorithm KNN classifier, a decision tree or a support vector machine SVM, and when the judgment result indicates that a shot cut change exists between the two image frames, determine that a shot change exists in the video image sequence.

When the first detection unit 302 is configured to perform the video shot gradual change detection process, the determination unit 303 is configured to, when it is determined that the similarity value between the two image frames is greater than a third preset threshold value and is smaller than a fourth preset threshold value, obtain the subsequent image frames of the two image frames, calculate the similarity value between pairwise image frames of the subsequent image frames until the similarity value between the pairwise image frames is greater than the fourth preset threshold value; and calculate the accumulated similarity values of the various image frames, and when the accumulated similarity values are smaller than a fifth preset threshold value, determine that a gradual change exists in the video image sequence and a shot change exists in the video image sequence.

When the first detection unit 302 is configured to execute the video shot gradual change detection process, the determination unit 303 is configured to:

when it is determined that the frame difference value between the two image frames is greater than a six preset threshold value and is smaller than a seven preset threshold value, obtain the subsequent image frames of the two image frames; calculate the frame difference value between pairwise image frames of the subsequent image frames until the frame difference between the pairwise image frames is smaller than the six preset threshold value; and calculate the sum of each obtained frame difference value, and when the sum is greater than the seventh preset threshold value, determine that a gradual change exists in the video image sequence and a shot change exists in the video image sequence.

According to some embodiments, the face detection device may further include:

a second detection unit, configured to carry out the face in-vivo detection based on face feature point detection to obtain a second judgment result. The determination unit 303 may be further configured to determine, when the second judgment result indicates that face in-vivo detection conditions are met and the first judgment result indicates that no shot change exists in the video image sequence, that the face in-vivo detection has passed.

The functions of the above-mentioned units may correspond to the processing steps of the above-mentioned methods illustrated in FIGS. 1 and 2 and the corresponding descriptions. These detailed steps are not be repeated. It should be noted that, since the method embodiments are illustrated in detail and device embodiments are illustrated relatively simple, those skilled in the art may understand that the device embodiments of the present application may be constructed with reference to the method embodiments. Other implementation modes that can be obtained by those skilled in the art without involving any inventive effort all fall within the scope of protection of the present application.

The specification has described methods, apparatus, and systems for face in-vivo detection. The illustrated steps are set out to explain the exemplary embodiments shown, and it should be anticipated that ongoing technological development will change the manner in which particular functions are performed. Thus, these examples are presented herein for purposes of illustration, and not for limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable storage medium" should be understood to include tangible items and exclude carrier waves and transient signals, i.e., be non-transitory. Examples include RAM, ROM, volatile memory, nonvolatile memory, hard drives, CD ROMs, DVDs, flash drives, disks, and any other known physical storage media. The units, systems, and devices described above may be implemented in a form of software, hardware, firmware, or any combination of software, hardware, and firmware. For examples, the units, systems, sub-systems, and devices may include or be implemented by a processor executing software instructions stored in the computer-readable memories.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A face detection method, comprising:
acquiring a video image sequence;
performing a video shot boundary detection process on the video image sequence to determine whether a shot change exists in the video image sequence to obtain a first judgment result, the video shot boundary detection process comprising:
performing an image feature extraction on the video image sequence in an image feature extraction region to obtain image feature vectors of two image frames; and
determining whether the two image frames are discontinuous in content, based on the image feature vectors; and
determining, when the first judgment result indicates that a shot change exists in the video image sequence, that face detection has failed.

2. The method according to claim 1, wherein the video shot boundary detection process further comprises:
calculating, with the image feature vectors of the two image frames, to obtain a similarity value between the two image frames to determine content continuity of the two image frames; and
determining, when it is determined that the two image frames are discontinuous in content according to the similarity value, that a shot change exists in the video image sequence.

3. The method according to claim 2, wherein the image feature extraction region comprises any one of: a single pixel feature extraction region, a pixel block feature extraction region, or a complete frame image feature extraction region.

4. The method according to claim 2, wherein the performing an image feature extraction on the video image sequence to obtain image feature vectors comprises at least one of:
obtaining, in a selected color region, pixel gray level statistics or pixel color statistics of image frames of the video image sequence, and constituting the image feature vectors with the obtained pixel gray level statistics or pixel color statistics;
obtaining a gray level histogram or color histogram of image frames in the video image sequence;
obtaining image edge features of image frames in the video image sequence; and transforming original images into other feature regions by means of a compressed domain to obtain corresponding image feature vectors.

5. The method according to claim 2, wherein the two image frames are the $i^{th}$ image frame and the $j^{th}$ image frame, where $j=i+n(n\geq 1)$, $i\geq 1$.

6. The method according to claim 2, wherein the video shot boundary detection process comprises a video shot cut detection process.

7. The method according to claim 6, wherein, the determining, when it is determined that the two image frames are discontinuous in content according to the similarity value between the two image frames, that a shot change exists in the video image sequence comprises:
   determining, when the similarity value between the two image frames is smaller than a first threshold value, that a cut change exists between the two image frames and a shot change exists in the video image sequence.

8. The method according to claim 6, wherein, the determining, when it is determined that the two image frames are discontinuous in content according to the similarity value between the two image frames, that a shot change exists in the video image sequence comprises:
   judging the similarity value between the two image frames based on a neighbor algorithm k-Nearest Neighbor (KNN) classifier, a decision tree, or a support vector machine (SVM), and determining, when the judgment result indicates that a cut change exists between the two frames of images, that a shot change exists in the video image sequence.

9. The method according to claim 2, wherein the video shot boundary detection process comprises a video shot gradual change detection process, and wherein, the determining, when it is determined that the two image frames are discontinuous in content according to the similarity value between the two frames of images, that a shot change exists in the video image sequence comprises:
   obtaining, when it is determined that the similarity value between the two frames of images is greater than a third threshold value and is smaller than a fourth threshold value, subsequent image frames of the two image frames;
   calculating a similarity value between pairwise image frames of the subsequent image frames until the similarity value between the pairwise image frames is greater than the fourth threshold value; and
   calculating a sum of the similarity values of the obtained image frames, and determining, when the sum of the similarity values is smaller than a fifth threshold value, that a gradual change exists in the video image sequence and a shot change exists in the video image sequence.

10. The method according to claim 1, further comprising:
    carrying out the face detection based on a face feature point detection process to obtain a second judgment result; and
    determining, when the second judgment result indicates that face detection conditions are satisfied and the first judgment result shows that no shot change exists in the video image sequence, that the face detection has passed.

11. The method according to claim 1, wherein the video shot boundary detection process further comprises:
    calculating, with the image feature vectors of the two image frames, to obtain a frame difference value between the two image frames to determine content continuity of the two image frames; and
    determining, when it is determined that the two image frames are discontinuous in content according to the calculated frame difference value between the two image frames, that a shot change exists in the video image sequence.

12. The method according to claim 11, wherein the image feature extraction region comprises any one of: a single pixel feature extraction region, a pixel block feature extraction region, or a complete frame image feature extraction region.

13. The method according to claim 11, wherein the performing an image feature extraction on the video image sequence to obtain image feature vectors comprises at least one of:
    obtaining, in a selected color region, pixel gray level statistics or pixel color statistics of image frames in the video image sequence, and constituting the image feature vectors with the obtained pixel gray level statistics or pixel color statistics;
    obtaining a gray level histogram or color histogram of image frames in the video image sequence;
    obtaining image edge features of image frames in the video image sequence; and
    transforming original images into other feature regions by means of a compressed domain to obtain corresponding image feature vectors.

14. The method according to claim 11, wherein the video shot boundary detection process comprises a video shot cut detection process.

15. The method according to claim 14, wherein, the determining, when it is determined that the two image frames are discontinuous in content according to the frame difference value between the two frames of images, that a shot change exists in the video image sequence comprises:
    determining, when the frame difference value between the two image frames is greater than a second threshold value, that a cut change exists between the two image frames and a shot change exists in the video image sequence.

16. The method according to claim 14, wherein, the determining, when it is determined that the two image frames are discontinuous in content according to the similarity value between the two image frames, that a shot change exists in the video image sequence comprises:
    judging the frame difference value between the two image frames based on a neighbor algorithm k-Nearest Neighbor (KNN) classifier, a decision tree or a support vector machine (SVM), and determining, when the judgment result indicates that a cut change exists between the two frames of images, that a shot change exists in the video image sequence.

17. The method according to claim 11, wherein the video shot boundary detection process comprises a video shot gradual change detection process, and wherein, the determining, when it is determined that the two image frames are discontinuous in content according to the frame difference value between the two image frames, that a shot change exists in the video image sequence comprises:
    obtaining, when it is determined that the frame difference value between the two image frames is greater than a six threshold value and is smaller than a seven threshold value, subsequent image frames of the two image frames;
    calculating the frame difference value between pairwise image frames of the subsequent image frames until the frame difference value between the pairwise image frames is smaller than the six threshold value; and calculating a sum of the frame difference values, and determining, when the sum is greater than the seventh threshold value, that a gradual change exists in the video image sequence and a shot change exists in the video image sequence.

18. A face detection device, comprising:

an acquisition unit configured to acquire a video image sequence;

a first detection unit configured to perform a video shot boundary detection process on the video image sequence to determine whether a shot change exists in the video image sequence to obtain a first judgment result, the video shot boundary detection process comprising:

performing an image feature extraction on the video image sequence in an image feature extraction region to obtain image feature vectors of two image frames; and     determining whether the two image frames are discontinuous in content, based on the image feature vectors; and a determination unit configured to determine, when the first judgment result indicates that a shot change exists in the video image sequence, that face detection has failed.

19. The device according to claim 18, wherein the first detection unit is further configured to:

calculate a similarity or frame difference value based on the image feature vectors of the two image frames to determine content continuity of the two image frames; and determine, when it is determined that the two image frames are discontinuous in content according to the similarity or frame difference value, that a shot change exists in the video image sequence.

20. The device according to claim 19, wherein the image feature extraction region comprises any one of: a single pixel feature extraction region, a pixel block feature extraction region, or a complete frame image feature extraction region.

* * * * *